Feb. 8, 1944.   D. R. G. PALMER   2,341,235
INSULATED ELECTRICAL CONDUCTOR AND METHOD OF MANUFACTURE
Filed June 23, 1941
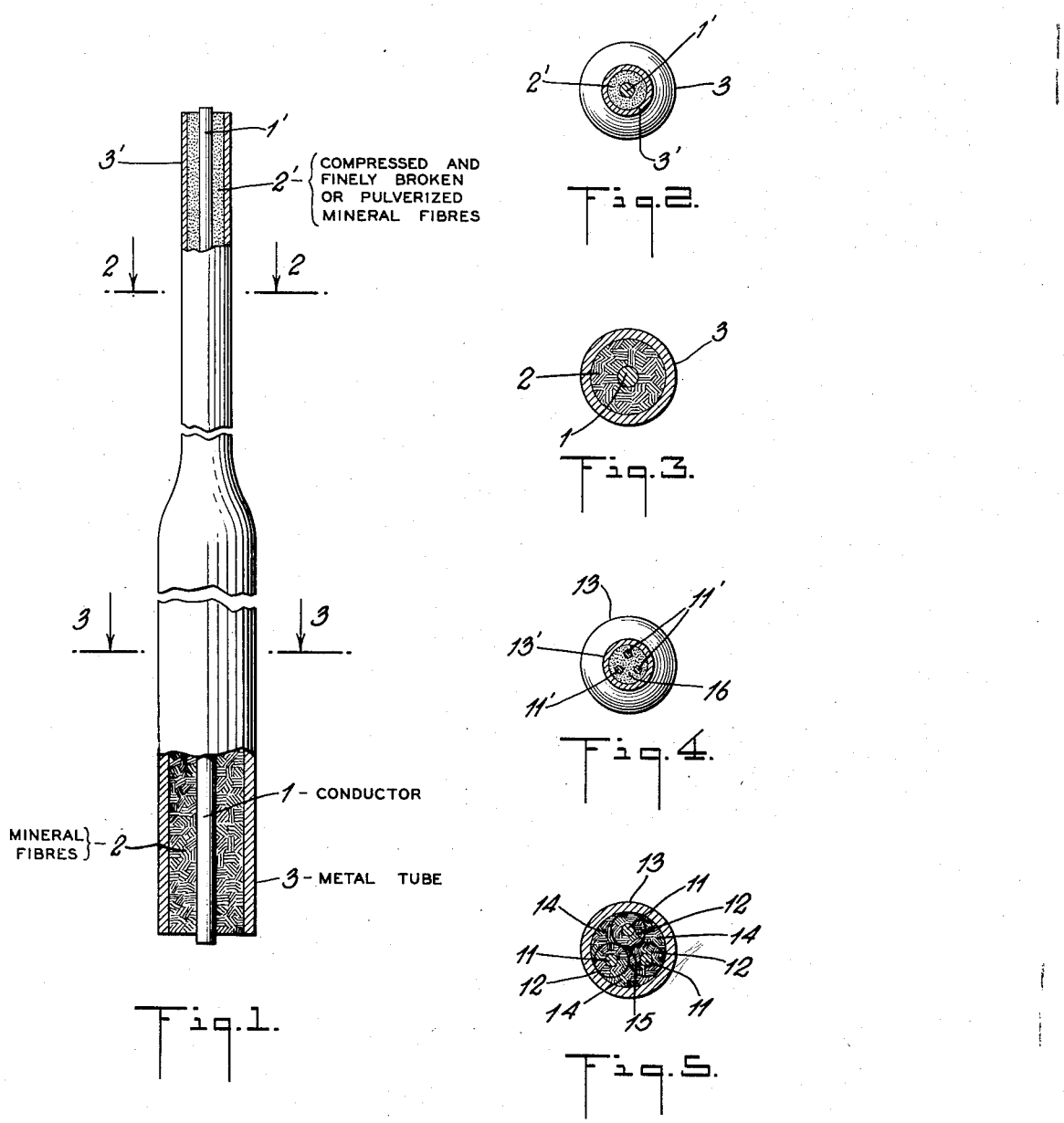
INVENTOR
DWIGHT R. G. PALMER
BY
ATTORNEY Patented Feb. 8, 1944

2,341,235

UNITED STATES PATENT OFFICE 2,341,235

INSULATED ELECTRICAL CONDUCTOR AND METHOD OF MANUFACTURE

Dwight R. G. Palmer, South Orange, N. J., assignor to General Cable Corporation, New York, N. Y., a corporation of New Jersey Application June 23, 1941, Serial No. 399,342

15 Claims. (Cl. 174—102)

This invention relates to insulated electrical conductors and to a method of manufacture thereof. More particularly the invention relates to insulated conductor constructions in which the conductor or conductors are insulated and spaced from an enclosing metal tube by incombustible mineral material. The tubular metal enclosure conveniently serves as a sheath affording mechanical protection for the insulated conductor or conductors and also may serve as an additional electrical conductor. It is an object of the invention to provide an improved insulated conductor. It is a further object of the invention to provide an improved method of manufacturing insulated electrical conductors. Other objects and advantages of the invention will appear hereinafter.

The present application is a continuation-in-part of my prior copending application for Insulated electrical conductor and method of manufacture, Serial No. 211,715, filed June 4, 1938.

An illustrative embodiment of the invention selected merely for descriptive purposes is shown in the accompanying drawing, in which:

Fig. 1 is a side elevation, partly in section, showing different stages in the process of manufacturing the insulated conductor;

Fig. 2 is a cross section on the line 2—2 of Fig. 1;

Fig. 3 is a cross section on the line 3—3 of Fig. 1; and

Figs. 4 and 5 are cross sections similar, respectively, to Figs. 2 and 3, except that they are for a three conductor construction instead of a single conductor construction.

It has been proposed heretofore to insulate electrical conductors with certain mineral powders, the powdered insulation, for example magnesium oxide, being enclosed with a suitable retaining covering or sheath, usually a metal tube. It has been proposed also to elongate such conductor assemblies by drawing the same down through dies, or by rolling, thereby compressing the insulating material into a very dense compact mass and reducing the size of the insulated conductor and the thickness of the enclosing metal sheath as well as the overall diameter.

Heretofore in conductors of this type the insulating material either has been in powder form prior to its introduction between the conductor and the enclosing metal wall, or, sometimes in the case of magnesium oxide, has been formed by oxidation of magnesium wrappings applied to the conductor before being introduced into the metal tube. With the known methods it is difficult to insure accurate spacing of the conductor or conductors within the enclosing metal tube, and it is difficult to procure a uniformly dense, compressed mass of insulation. According to the present invention a new and simplified method of applying the insulating material is utilized which results in an improved conductor construction and which permits the use of materials in forms not heretofore usable in the manufacture of conductors of this general type.

According to the present invention a conductor core such as a wire or rod 1, for example copper, has applied thereto a covering 2 of mineral fibres, for example spun glass or mineral wool. These materials are brittle by nature and the fibres produced therefrom are rather easily broken by shock or by the application of pressure even though they are so fine as to be very flexible and capable of being woven into cloth which does not split on bending or folding. Desirably very fine and flexible mineral fibres, for example glass fibres a few ten thousandths of an inch in diameter, are applied to the conductor in a densely matted, uniformly thick layer, as by wrapping the conductor with glass yarn.

The conductor core 1 with its covering 2 of mineral fibres then is enclosed within a closely fitting metal tube 3, for example copper. It is immaterial to the present invention just how the metal tube is applied. Since the insulated and sheathed conductor core will be drawn down, as hereinafter described, to reduce the conductor size as well as the overall size, the conductor core initially may be much larger than the ultimate conductor size. That being the case, it is practical to use comparatively short lengths of conductor core which, after being covered with the mineral fibres, may be drawn or pushed into a metal tube with a comparatively tight fit.

The conductor 1 with its covering 2 of mineral fibres and the enclosing metal tube 3 then is elongated and reduced in size as by drawing through one or a series of dies, or by rolling, to reduce the overall diameter. This reducing operation compresses and breaks the mineral fibres, changing the insulation into a densely compacted broken fibrous mass. Further elongation and reduction of the structure by drawing or rolling accomplishes a further reduction in the size and the thickness of the metal tube, and, since the mineral mass is substantially incompressible, also accomplishes a corresponding reduction in the conductor size. If desired, the reduction of the conductor construction may be carried through several stages to result in an elongation up to twenty or more times the original length, the insulated conductor undergoing a corresponding reduction in size without material change in shape and without appreciable change in its relative position within the enclosing metal sheath. This continued reduction progressively breaks the mineral fibres into shorter and shorter lengths and may be continued until the original fibres have become partially or completely pulverized, although this is not essential. The reduction may be discontinued while there still are fibres of short, but appreciable, lengths. If desired, the conductor may be annealed, because the insulation and sheath are incombustible and not injured by heat.

In Fig. 1 the reference numeral 1' represents the conductor after the drawing operation, 2' represents the compressed, finely broken or pulverized mineral fibre, and 3' represents the reduced tubular wall.

The invention is applicable also to multiple conductor constructions in which a plurality of conductor cores, each enclosed within a wall of mineral fibre are enclosed, preferably with valley fillers of the same or similar mineral fibres, within a closely surrounding metal tube. Such an assembly may be elongated and reduced in a manner similar to that above described for the reduction of the single conductor construction, and the several conductors will be reduced in size without substantial change in their shape or their relative positions within the metal sheath.

Figs. 4 and 5 represent cross sections similar, respectively, to Figs. 2 and 3 except that they are for a three conductor construction. Three wires or rods 11 have applied thereto individual coverings 12 of mineral fibres and then are enclosed with valley fillers 14, 15 of similar mineral fibres within a closely surrounding metal tube 13. After elongation and reduction of this assembly in the manner described the conductors are represented by the reference numeral 11', the compressed, finely broken or pulverized mineral fibre by the reference numeral 16 and the reduced outer wall by the reference numeral 13'.

The present invention provides a new method of producing insulated conductors and cables in which the insulation comprises a densely compacted mass of finely broken or pulverized mineral material, the novel method permitting the use of a fibrous insulating material which is broken into short lengths or pulverized during the process of manufacture and after its application to the conductor. Application of the insulating material is simplified and a consistently more uniform article is produced.

While one embodiment of the invention has been described in order to illustrate the principles of the invention, it is to be understood that the invention may be variously embodied within the limits of the prior art and the scope of the subjoined claims.

I claim:

1. An article of manufacture comprising in combination an electrical conductor, a continuous metal tube surrounding the conductor, and a highly compressed layer of pulverized mineral fibre surrounding and spacing the conductor from the metal tube.

2. An article of manufacture comprising in combination an electrical conductor, a continuous metal tube surrounding the conductor, and a highly compressed layer of pulverized fibrous glass surrounding and spacing the conductor from the metal tube.

3. An article of manufacture comprising in combination an electrical conductor, a continuous metal tube surrounding the conductor, and a highly compressed layer of pulverized mineral wool surrounding and spacing the conductor from the metal tube.

4. An article of manufacture comprising in combination an electrical conductor, a continuous metal tube surrounding the conductor, and a highly compressed layer of pulverized, brittle mineral fibre surrounding and spacing the conductor from the metal tube, the mineral fibre having been pulverized in situ.

5. The method of manufacturing an insulated electrical conductor which comprises enclosing an elongated conducting core with a wall of brittle mineral fibre, enclosing the conductor core and fibrous wall with a closely-fitting, continuous metal tube and subjecting the assembled structure to mechanical working to pulverize and compress the mineral fibre into a dense mass of powder.

6. The method of manufacturing an insulated electrical conductor which comprises enclosing an elongated conducting core with a wall of brittle mineral fibre, enclosing the conducting core and fibrous wall with a closely-fitting, continuous metal tube, subjecting the assembled structure to a drawing operation to compress and pulverize the mineral fibre, and continuing the drawing operation to further elongate the structure and reduce the size of the enclosed electrical conductor.

7. The method of manufacturing an insulated electrical conductor which comprises enclosing an elongated conducting core with a wall of spun glass, enclosing the conductor core and glass wall with a closely-fitting, continuous metal tube and subjecting the assembled structure to mechanical working to pulverize and compress the spun glass into a dense mass of powder.

8. The method of manufacturing an insulated electrical conductor which comprises enclosing an elongated conducting core with a wall of mineral wool, enclosing the conductor core and fibrous wall with a closely-fitting, continuous metal tube and subjecting the assembled structure to mechanical working to pulverize and compress the mineral wool into a dense mass of powder.

9. The method of manufacturing an insulated electrical conductor which comprises enclosing the conductor with a wall of pulverulent mineral fibres, enclosing the fibres with a covering and then pulverizing the fibres.

10. The method of manufacturing an insulated electrical conductor which comprises enclosing the conductor with a wall of spun glass, enclosing the glass with a flexible covering and then reducing the spun glass to a powder.

11. The method of manufacturing an insulated electrical conductor which comprises enclosing the conductor with a wall of mineral wool, enclosing the mineral wool with a flexible covering and then reducing the mineral wool to a powder.

12. In combination a central conductor, a metal sheath enclosing and spaced from said conductor and tightly packed glass fibres filling the space between said conductor and said enclosing sheath, the length of said fibres being generally less than one-sixteenth of an inch.

13. In combination an inner conductor, a metal sheath enclosing and spaced from said conductor, and a layer of glass fibres compacted and crushed to small particles between said inner conductor and said enclosing sheath.

14. The method of manufacturing an insulated electrical conductor which comprises enclosing an elongated conducting core with a wall of spun glass, enclosing the conductor core and glass wall with a closely-fitting, continuous metal tube and subjecting the assembled structure to mechanical working to crush the glass fibres to generally less than one-sixteenth of an inch in length and compress the crushed glass into a dense mass.

15. The method of manufacturing an insulated electrical conductor which comprises enclosing the conductor with a wall of spun glass, enclosing the glass with a flexible covering and then reducing the spun glass to lengths generally less than one-sixteenth of an inch.

DWIGHT R. G. PALMER.